United States Patent [19]

Turner

[11] Patent Number: 5,892,821

[45] Date of Patent: Apr. 6, 1999

[54] VIRTUAL WIDE AREA CENTREX

[75] Inventor: George W. Turner, Nepean, Canada

[73] Assignee: Bell Sygma Inc., Toronto, Canada

[21] Appl. No.: 766,277

[22] Filed: Dec. 13, 1996

Related U.S. Application Data

[63] Continuation-in-part of Ser. No. 460,640, Jun. 2, 1995, abandoned.

[51] Int. Cl.⁶ .............................. H04M 3/42; H04M 7/00
[52] U.S. Cl. ........................... 379/220; 379/207; 379/230
[58] Field of Search .................................... 379/201, 207, 379/219, 220, 221, 229, 230, 211, 234

[56] References Cited

U.S. PATENT DOCUMENTS

| | | | |
|---|---|---|---|
| 4,191,860 | 3/1980 | Weber | 379/115 |
| 4,953,203 | 8/1990 | Shepard | 379/207 |
| 5,027,341 | 6/1991 | Jarvis et al. | 370/235 |
| 5,212,691 | 5/1993 | Hokari | 370/384 |
| 5,247,571 | 9/1993 | Kay et al. | 379/207 |
| 5,282,244 | 1/1994 | Fuller et al. | 379/230 |
| 5,311,584 | 5/1994 | Bogart et al. | 379/220 |
| 5,311,586 | 5/1994 | Bogart et al. | 379/221 |
| 5,323,452 | 6/1994 | Dickman et al. | 379/201 |
| 5,339,356 | 8/1994 | Ishii | 379/234 |
| 5,386,467 | 1/1995 | Ahmad | 379/220 |
| 5,422,941 | 6/1995 | Hassenauer et al. | 379/207 |
| 5,455,855 | 10/1995 | Hokari | 379/229 |
| 5,467,390 | 11/1995 | Brankley et al. | 379/229 |
| 5,481,603 | 1/1996 | Gutierrez et al. | 379/221 |
| 5,517,564 | 5/1996 | Slater et al. | 379/229 |
| 5,524,146 | 6/1996 | Morrisey et al. | 379/207 |
| 5,526,414 | 6/1996 | Bédard et al. | 379/221 |
| 5,539,817 | 7/1996 | Wilkes | 379/207 |
| 5,553,130 | 9/1996 | Turner | 379/220 |
| 5,583,926 | 12/1996 | Venier et al. | 379/207 |
| 5,583,929 | 12/1996 | Ardon | 379/207 |
| 5,608,790 | 3/1997 | Ardon | 379/207 |
| 5,644,632 | 7/1997 | Ardon | 379/220 |
| 5,768,358 | 6/1998 | Venier et al. | 379/201 |

*Primary Examiner*—Scott Wolinsky
*Attorney, Agent, or Firm*—Foley & Lardner

[57] ABSTRACT

A method is disclosed which brings together a combination of special IN features and techniques to allow Centrex stations supported by a plurality of central office switching systems, each at different locations, to function from the customer's perspective as though they were served by a single central office switch. The key to Virtual Wide Area Centrex is a total separation of the telephone numbers seen and used by customers (Customer Number Address—CNA) from the telephone numbers used internally by the network for call routing purposes (Network Node Address—NNA), such that there are two separate and distinct numbering plan domains. A central database, interconnected with each of the Centrex switches, maintains the mapping between CNA and NNA. This database is called upon, as required, to do both forward and reverse translations—i.e., from CNAs to NNA and vice-versa. The net result is that CNAs identify people (e.g., a customer's specific employees and agents) whereas NNAs identify locations (e.g., offices and conference rooms). This permits an environment in which individuals may move from one physical location to another, regardless of the serving central office switch, while keeping their CNA and their network access privileges.

16 Claims, 6 Drawing Sheets

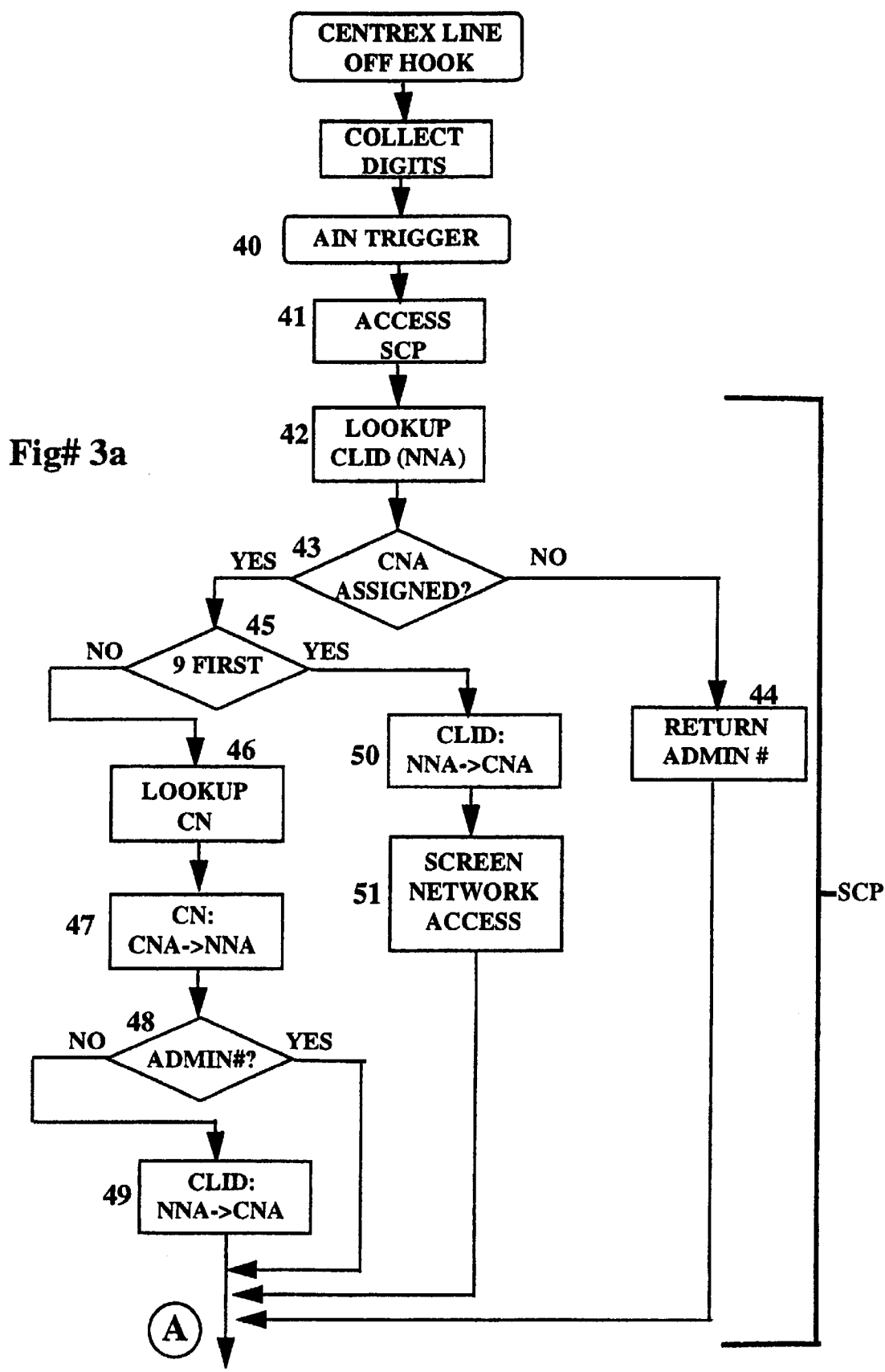
Fig# 3a

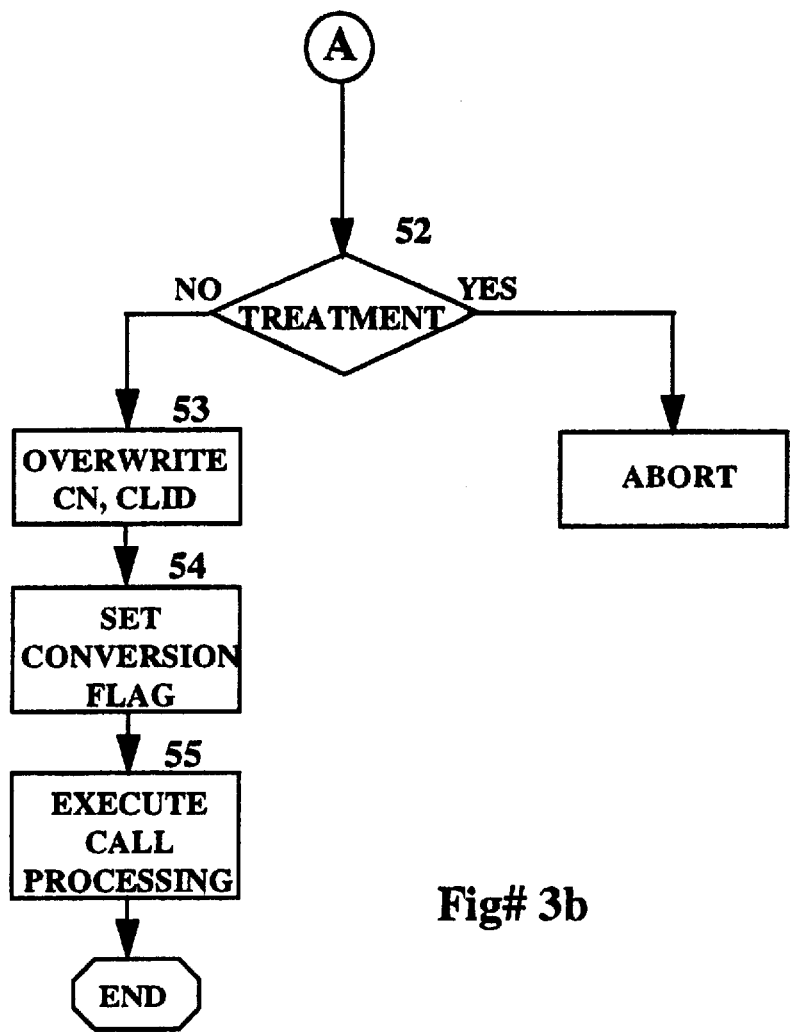
Fig# 3b

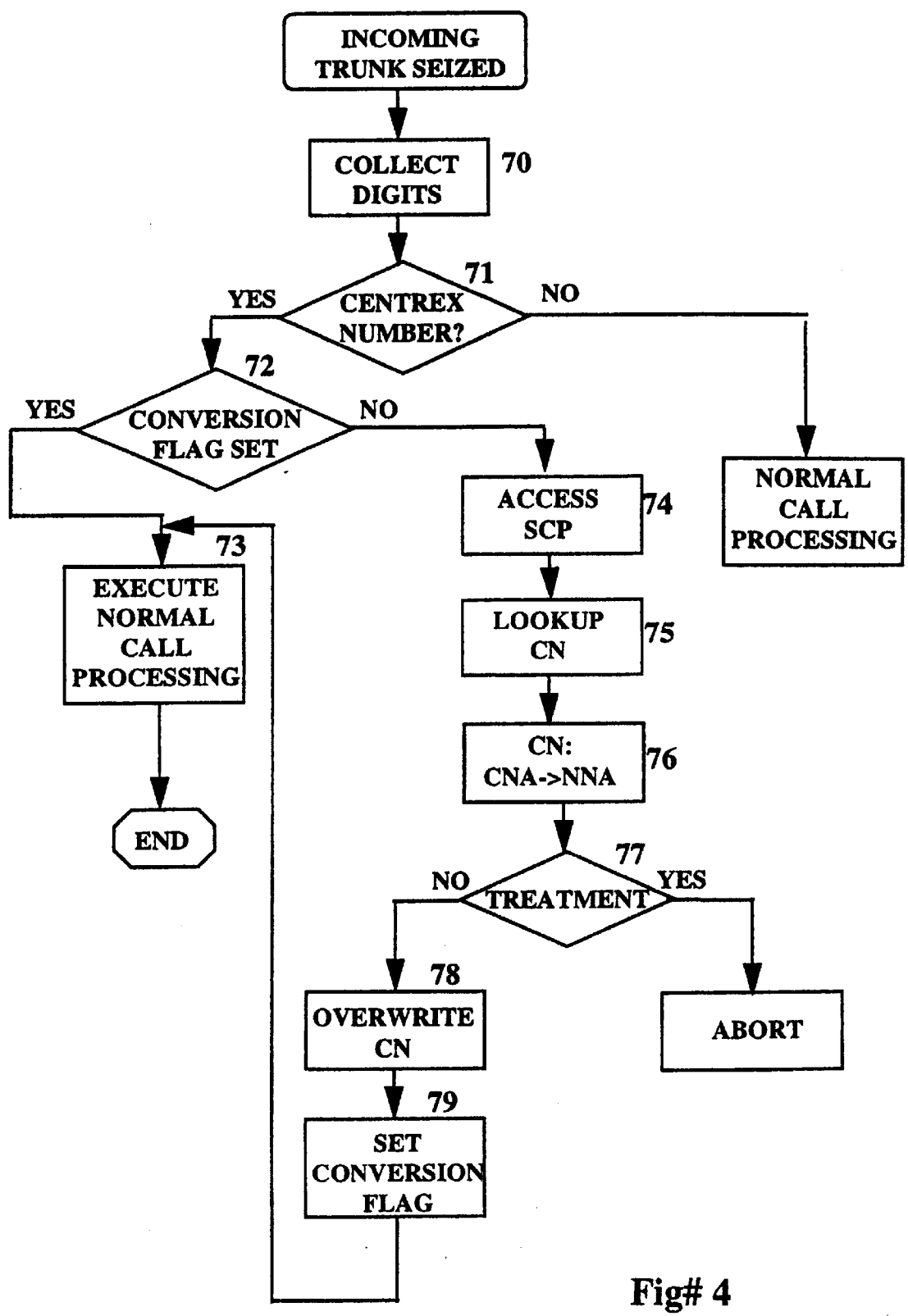
Fig# 4

Fig. 5a

| Virtual number CNA (KEY) | Real number NNA (RECORD) |
|---|---|
| . | . |
| 567-3456 | 567-1234 |
| 567-1234 | 234-4567 |
| . | . |
| . | . |
| 567-2345 | 456-1234 |
| . | . |
| . | . |
| . | . |
| 567-4567 | 789-1234 |

Fig. 5b

| Real number NNA (KEY) | Virtual number NNA (RECORD) |
|---|---|
| . | . |
| 567-1234 | 567-3456 |
| 234-4567 | 567-1234 |
| . | . |
| . | . |
| 456-1234 | 567-2345 |
| . | . |
| . | . |
| . | . |
| 789-1234 | 567-4567 |

# VIRTUAL WIDE AREA CENTREX

This application is a continuation-in-part application of application Ser. No. 08/460,640 filed Jun. 2, 1995, now abandoned. This application is also related to application Ser. No. 08/445,538, filed on may 22, 1995, now U.S. Pat. No. 5,553,130.

FIELD OF THE INVENTION

This invention relates to telecommunications Intelligent Network call routing via SS7 signalling from a network of switches, but more particularly to a method of providing an improved Wide Area Centrex service such that feature transparency is achieved across a plurality of central office switches, each serving one or more customer locations.

DESCRIPTION OF THE PRIOR ART

Centrex Service is a widely deployed generic business offering which provides customers with features that are normally associated with PBXs (Private Branch Exchanges). Whereas a PBX is located on a customer's premises, and is generally connected to other PBXs in the area via leased facilities, Wide Area Centrex service is provided from a Telco's central office premises and serves the area (generally an entire city) via various local and remote serving facilities. The services offered by Centrex-capable central offices are shared with other business customers as well as with the PSTN (Public Switched Telephone Network), thus offering an extremely cost-effective solution to private switching and value-added services.

Customers having several service centers or locations within an Exchange, but which are distributed among several central office serving areas, i.e. with different NXXs, are customarily served at all locations from a single central office, for example, the CO that serves the main site. The remaining sites are then served by digital remote concentrators that are homed on the main CO. This arrangement allows all the customer's locations to be served by a single NXX, which becomes, in effect, a private Numbering Plan that can be administered by the customer.

In order to achieve a Private Numbering Plan which can be administered by the customer, as well as to avoid certain feature transparency issues, it is customary to serve all of a particular customer's locations from a single central office switch. The major shortcoming of this serving arrangement is the cost of deploying remote serving arrangements, generally consisting of remote switch peripherals attached to the main serving central office switch via dedicated high-speed transmission facilities. The cost of such non-standard facilities is such that—in addition to increasing the basic provisioning cost—the service cannot be economically provided to all locations. This is a major irritant for customers, particularly those with a large main office and many small branch locations within a city.

In recent years, with the advent of the Intelligent Network, a number of potential solutions have been proposed for portions of the service, such as routing using a database.

One such solution is described in U.S. Pat. No. 4,191,860, issued Mar. 4, 1980, to Roy P. Weber. This and a number of subsequent patents have dealt with inward call routing, primarily for 800 number type calls. Those related to Centrex database applications have generally dealt with enhanced vertical feature functionality—e.g., speed or repertory dialing, centralized message detail recording, automatic call routing, person locator services. Only the following two patents attempt to address the need identified above.

U.S. Pat. No. 5,247,571, issued Sept. 21, 1993, to William A. Kay et al., discloses a method "for providing private network service features to business customers with facilities at a number of geographically diverse locations through the public telephone network." However, this patent focuses on extracting intelligence from the network switches and vesting it in a central database. The intent appears to be to reduce or eliminate switch-vendor-provided software by providing equivalent functionality in a central database under the control of the Telco. Aside from moving some network intelligence from a plurality of switches to a central database, this patent offers only a limited and somewhat questionable capability for Private Numbering Plan administration.

In general, the method achieves benefits by bringing the Centrex station features, translations, and data recording from all the individual switches to a central database where they can be more readily accessed or modified by the customer. With respect to numbering plan administration, the best mode for carrying out the invention is revealed as abbreviated dialing, a private "location prefix" being required to avoid number conflicts amongst switches. However, a split Customer Number Access/Network Node Address (CNA/NNA) scheme—identified in the Kay patent as "private number"/North American Numbering Plan (NANP) number—is proposed as an alternative to the abbreviated number scheme and is identified as "Portable Intercom Number Dialing."

There appear to be at least two serious shortcomings to this scheme: i) internal callers can use the private number to reach an internal extension but external callers must use the NANP number to reach the same extension; ii) terminating features that need to identify the calling party, such as Integrated Voice Messaging Systems (IVMS) will receive the NANP instead of the private number, making it difficult for internal users to recognize calls from other internal users.

U.S. Pat. No. 5,422,941, issued Jun. 6, 1995, to George Hasenauer et al., expands on the method of U.S. Pat. No. 5,247,571 by addressing a serious shortcoming identified by switch vendors: using a central database for Private Numbering Plan administration and also for the provisioning of vertical Centrex features (e.g., call transfer, conferencing) "causes feature conflict problems." The invention reveals a method of resolving the conflicts by introducing two separate translation steps, one in the switch and the other at the SCP. As such, this second patent is merely a technical refinement of the first and introduces nothing new in terms of capability. "Portable Intercom Number Dialing" is elevated in importance and given a feature name but retains the shortcomings identified above.

Neither of these patents addresses the fundamental issue of making a plurality of central office switching systems, each at a different physical location, operate as if they were a single switch. The melding is not seamless, imposing operations or conditions which are not present when service is provided from a single switch: either the user is required to dial a location prefix to identify the target switch or there is an awkward mixing of private and public numbers. In the first instance, users should not be required to know which network switch serves a particular Centrex station. In the second, a user should only need to remember one number—if a short intercom number is to be introduced, it should be an abbreviation of the public number (typically the last three, four, or five digits), and not a totally different number.

SUMMARY OF THE INVENTION

There remains a need for providing a Centrex type service which extends functionality to a plurality of central office switches in a manner that is transparent to the user.

It is therefore an object of the present invention to provide Virtual Wide Area Centrex (VWAC) in which there is a total separation of the telephone numbers seen and used by customers (Customer Number Address—CNA) from the telephone numbers used internally by the network for call routing purposes (Network Node Address—NNA), such that there are two separate and distinct numbering plan domains.

The most significant digits of the telephone number normally associated with the customer, per the North American Numbering Plan—typically the NPA NXX—form the most significant digits of the CNA. The remaining digits of the CNA—typically four—are administered by the customer. With respect to the NNA, each geographic location has an unique NPA NXX, generally one currently associated with the serving switch. The remaining digits of the NNA are randomly assigned to subscribed Centrex stations by Telco personnel and are of no consequence to the customer.

In essence, what is being disclosed is a multi-switch network deployment of an internal switch design concept, wherein numbers seen and used by customers are different from those used internally by the switch. The former are Directory Numbers (DNs) whereas the latter are commonly called Line Equipment Numbers (LENs). With respect to operation of an individual switch, only Telco operations personnel need to know the LEN, and, similarly, in a VWAC environment, only Teleco operations personnel need to know the NNA.

Another object of the present invention is to provide VWAC services which make use of a central database—typically an SCP—to translate CNAs to NNAs and vice versa of stations served by Centrex type services.

A further object of the invention is to provide dynamic control of the numbering plans through the central database so that users may readily move from one location to another while retaining their CNAs. Further enhancements, to be discussed later, make it possible for users to move from one physical location to another as quickly and easily as wireless users may change location.

In accordance with an embodiment of the present invention, there is provided a method of providing Wide Area Centrex to a telephone network having a plurality of switching offices capable of providing traditional Centrex station features (e.g., call transfer, conference bridging, multiple appearance directory number, "RingAgain"/ Automatic Callback), and of supporting SSPs (Service Switching Points) operating with AIN (Advanced Intelligent Network) application software. The method comprises the steps of:

assigning, as switch-resident datafill by Telco personnel at Centrex network setup time, a "real" telephone number to each subscribed station at the customer sites, this being the NNA;

assigning, on an ongoing basis by the Telco or by the customer, an abbreviated "virtual" telephone number to each active station (i.e., a station with a specific assigned user) at the customer sites, this being the least significant digits of the CNA;

assigning, as switch-resident datafill by Telco personnel at Centrex network setup time, a Business Group ID (BGID) to each subscribed station at the customer sites, this ID serving to imply the most significant digits which are missing from the abbreviated CNA (typically the NPA NXX); treating the called number for all originating calls, whether dialed by a Centrex user or received from the PSTN (Public Switched Telephone Network), as a CNA;

connecting each central office to a central database—i.e., an SCP (Service Switching Point)—this database having a number translation capability to map CNAs into NNAs and vice-versa; assigning, as switch-resident datafill by Telco personnel at Centrex network setup time, AIN trigger datafill such that at least some Centrex related calls generate queries to the central database if certain criteria are met;

at the database, translating the BGID plus the called abbreviated CNA into an NNA to determine how to route a call to a station at any one of the customer sites served by the Centrex type services; at the database, translating an originating, switch-supplied Centrex Calling Line ID (CLID) from an NNA to a CNA prior to authorizing the switch to execute call completion, either to an internal Centrex station or to the PSTN, such that Centrex, CLASS, or IVMS features at each destination receive a network-dialable number allowing them to work as they did prior to the present invention; after a called number translation, at the switch that launched the query, setting a Conversion Flag (i.e., a traveling class mark) on the call to indicate that the called number has been converted from a CNA to an NNA;

at the terminating switch, with the aid of the aforementioned Conversion Flag, ensuring that no call can be terminated at a Centrex station unless the called number has been converted to an NNA; connecting each central office to a high-speed data router—i.e., an STP (Signalling Transfer Point)—such that "connectionless" data messages—i.e., SS7 TCAP messages—can be routed from one network node to another;

assigning, as STP-resident datafill by Telco personnel at Centrex network setup time, appropriate GTTs (Global Title Translations) such that TCAP queries from the AIN triggers related to the Wide Area Centrex service are routed to the appropriate SCPs, and that TCAP end-to-end messages for various Centrex features are first routed to a Signalling Processor Adjunct (SPA);

at the aforementioned Signalling Processor Adjunct, performing a 10-digit translation of a CNA into the DPC for the destination switch, and the translation of the calling or called number fields in the SS7 TCAP message from a CNA to an NNA, or vice-versa, as required by specific end-to-end service features;

providing a database administration system—i.e., a Service Management System (SMS)—to receive numbering plan changes from the customer, create and assemble the necessary network service orders, forward these service orders to the SCP and the Signalling Processor Adjunct, and save master copies;

providing an outboard processor, having an internal lookup database that is kept current by the SMS, to convert switch-based operational measurement data such as SMDR from NNA to CNA prior to their being presented to the customer.

BRIEF DESCRIPTION OF THE DRAWINGS

The invention will be better understood by an examination of the following description, together with the accompanying drawings, in which:

FIGS. 3a and 3b are flow charts illustrating how calls generated from a Centrex station are handled in an originating switch;

FIG. 4 is a flow chart illustrating how calls from other Centrex switches and from the PSTN are handled in a terminating switch; and FIG. 5a and FIG. 5b are translation tables for use with the network of the present invention.

DESCRIPTION OF THE PREFERRED EMBODIMENTS

In order to lighten the following description, the following acronyms will be used:

AIN: Advanced Intelligent Network;
BGID: Business Group Identification;
CCS7: Common Channel Signalling 7;
CLID: Calling Line Identification;
ClgPn: Calling Party Number;
CNA: Customer Number Address;
DN: Directory Number;
DTMF: Dual Tone Multi-Frequency;
GAP: Generic Address Parameter;
GTTs: Global Title Translations;
IAM: Initial Address Message;
IEC: Inter-Exchange Carrier;
IN: Intelligent Network;
ISDN: Integrated Services Digital Network;
ISUP: ISDN User Part;
IVMS: Integrated Voice Messaging Systems;
LENs: Line Equipment Numbers;
MBG: Multi-switch Business Group;
NANP: North American Numbering Plan;
NNA: Network Node Address;
PBXs: Private Branch Exchanges;
PIC: Primary Interexchange Carrier;
PNP: Private Numbering Plan;
PSTN: Public Switching Telephone Network;
SCP: Signalling Control Point;
SMS: Service Management System;
SSPs: Service Switching Points;
SS7: Signalling System 7;
STP: Signalling Transfer Point;
TCAP: Transaction Capabilities Application Part; and
VWAC Virtual Wide Area Centrex.

Figure 1:
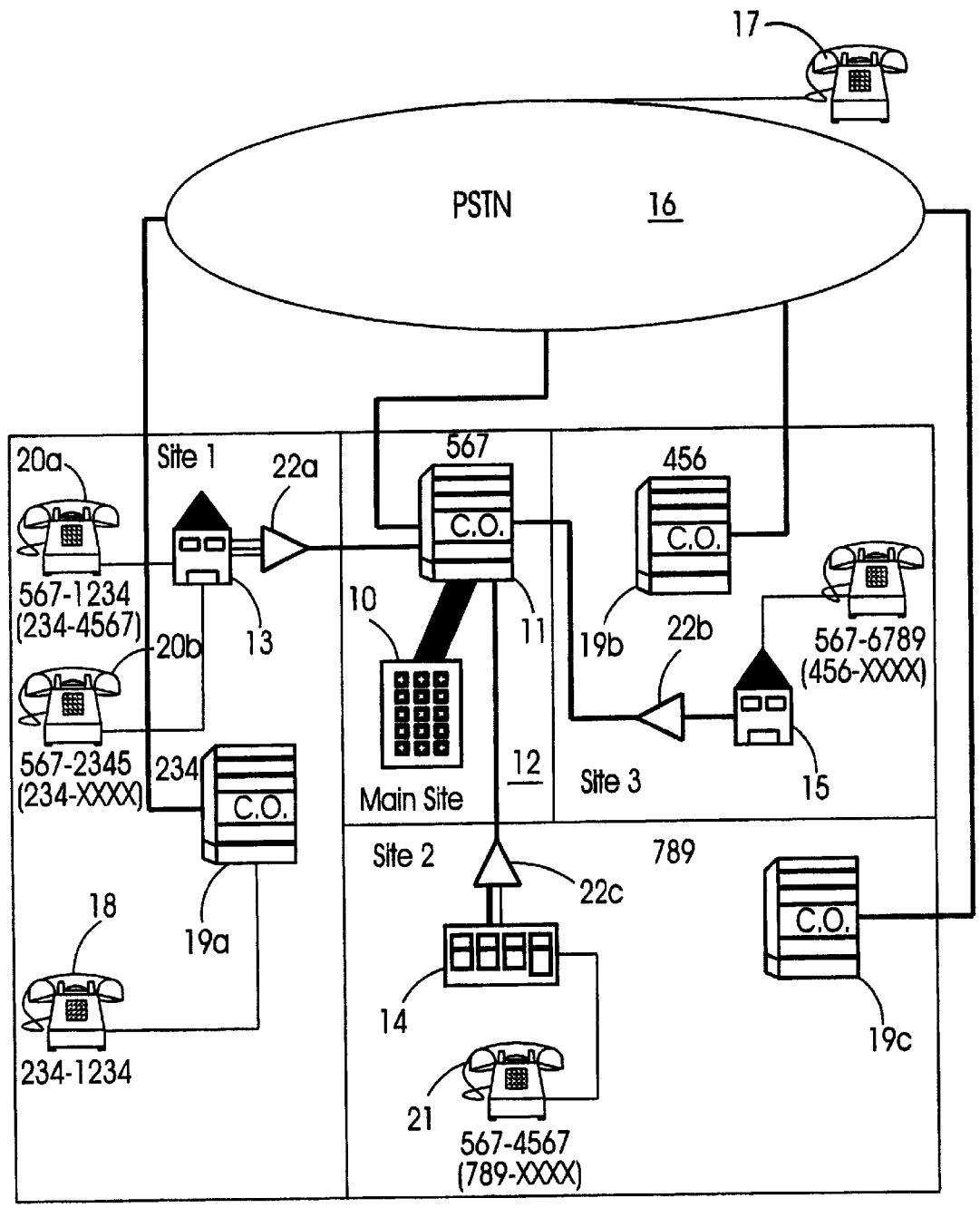
FIG. 1 is a block diagram of the main elements forming part of a prior art telephone network offering a form of Wide Area Centrex that ensures complete feature transparency across a plurality of geographically diverse customer locations.
Figure 2:
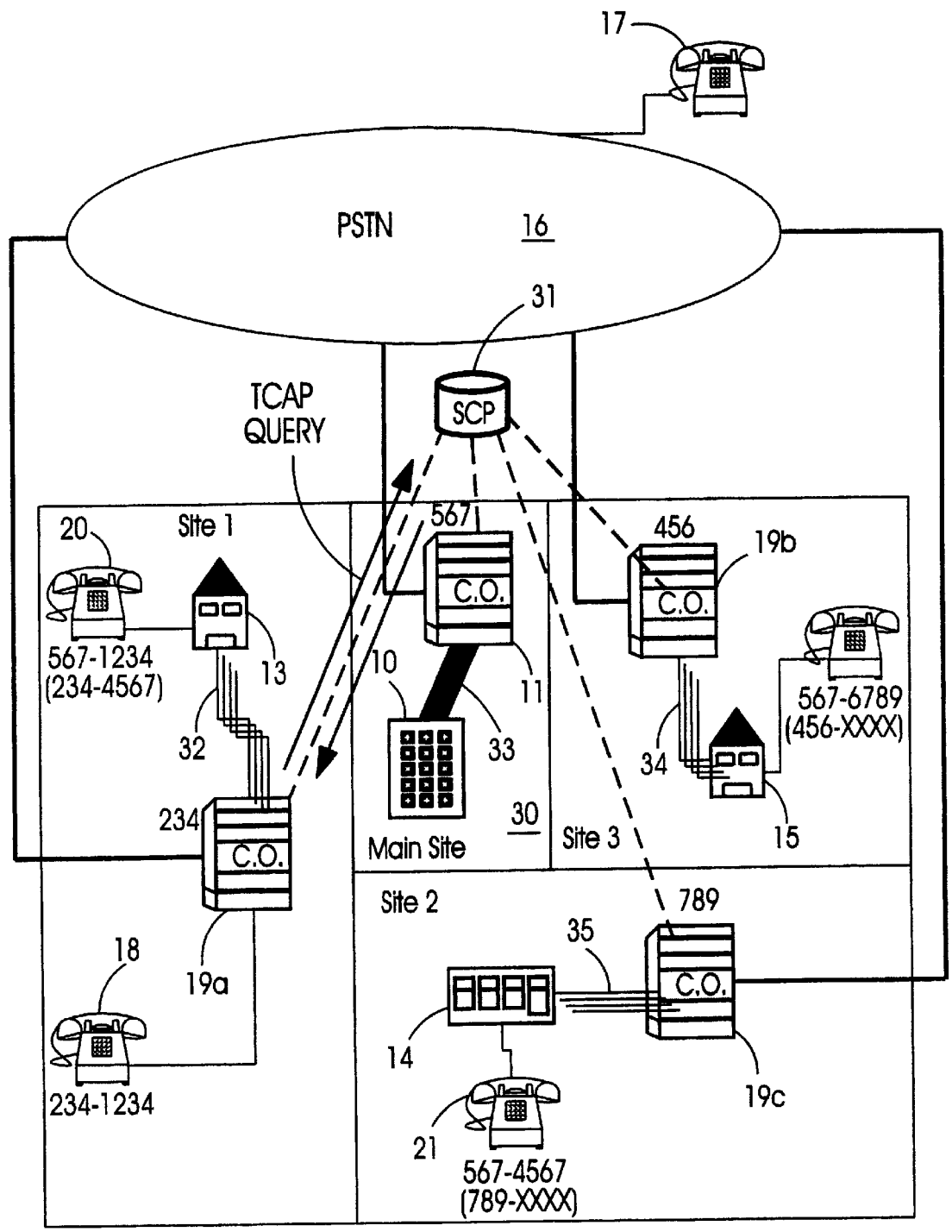
FIG. 2 is a block diagram of the main elements forming part of a telephone network offering Virtual Wide Area Centrex according to the present invention.

The networks shown in FIGS. 1 and 2 do not show, for sake of clarity, all elements normally associated with SS7 messages. A typical SS7 network consists of signalling links and nodes. SS7 nodes are referred to as Signalling Points (SP) and are interconnected by signalling links. Each SP is assigned a unique point code, serving as the network address for message routing. SS7 Signalling Points (SP) include Service Switching Points (SSP), Service Control Points (SCP), and Signal Transfer Points (STP). Persons skilled in the art to which the present invention pertains are assumed to be familiar with conventional SS7 functionality, AIN application fundamentals, as well as basic Centrex features and functions.

Services Switching Points (SSPs) are associated with SS7 equipped switching offices. Their prime function is to serve as a source and destination for messages related to the calls they handle. Outgoing messages (i.e., queries) destined for SCPs are formatted in accordance with the SS7 Transaction Capabilities Applications Protocol (TCAP). These messages are triggered at various points during call processing, on some or all calls, if various criteria are met—for example, combinations of a particular calling station, a particular called number (or portion thereof), or a particular incoming trunk group. Call processing is suspended until a response, also in TCAP format, is received from the SCP, whereupon call processing either simply ignores the response and continues, proceeds using SCP-modified call data, or is aborted.

Service Control Points (ScPs) are often referred to as databases in that lookups of calling and called numbers are among the most frequently performed functions. Through the use of "service logic," SCPs can also serve as centralized sources of network intelligence by determining how calls are to be routed through the network. Queries and responses to and from the SCP utilize the aforementioned TCAP, and appear as data packets with source and destination addresses in the form of point codes.

Signalling Transfer Points (STPs) are high-speed data routers which provide a packet switching function amongst other nodes in an SS7 network. They examine incoming messages for a point code and then use this to select an appropriate SS7 link to carry the message to the destination node. Three important functions of an STP are i) to act as a tandem point for signalling links so that every node in the network does not have to be linked to every other node; ii) to provide a gateway for SS7 network interconnection to screen out unauthorized access; and iii) when so requested, to do a database lookup on the called number and overwrite the original destination point code. This latter function, called Global Title Translation for TCAP applications, is service-specific, the specific service being identified by a 3-digit Service Subsystem Number (SSN). This third function of an STP is used by certain enhanced station-to-station Centrex features in the prior art as well as in VWAC.

Service Management Systems (SMSs) provide a master database for all network data needed to specify a particular service. The SMS is also responsible for formulating and delivering service orders for all other network nodes, particularly SCPs and STPs, such that the specified service configuration is realized.

The SS7 messages transmitted between the SSP and the SCP are formatted in accordance with TCAP, as mentioned above, which provides standardized formats for various query and response messages. Each query and response includes data fields which contain a variety of information about a call in progress. Of particular importance to the present invention are the fields containing the calling and the called telephone numbers. The calling number is generated by the SSP, as soon as a station goes off-hook, in that the CLID for each station is part of the switch's Telco-provisioned datafill. The called number, on the other hand, represents the digits that a user has just entered on a dial pad to set up the call in progress. Also important in the current context is a Service Indicator and a Trigger Identity so that the TCAP query can be routed to the appropriate AIN SCP, and this SCP can select a query processing routine from amongst a plurality of such routines. In addition to providing modified call data, responses also contain an instruction to the SSP on what to do with the response and how to proceed with the call.

FIG. 1 shows a prior art telephone network offering Wide Area Centrex to a number of remote customer sites.

When customers have several locations within an Exchange, but which are distributed among several central office serving areas—historically known as wire centers—it is customary to serve all the locations from a single central office. Generally, this is the central office that serves the customer's main site. The remaining sites are then served by remote digital concentrators that are homed on the main switch via dedicated high-speed transmission facilities. The object of this costly configuration is to provide seamless feature functionality across all the stations, particularly with respect to administration of the Private Numbering Plan.

For example, in FIG. 1, the main site 10 of a Centrex customer is served by a central office 11 which provides Centrex functionality to other sites, remotely located away from the serving area 12 of central office 11. In FIG. 1, the other sites are depicted at reference numeral 13 for site 1, 14 for site 2, and 15 for site 3. All central offices are connected to the PSTN 16 and all sites in this example are located within the same exchange. That is, all sites are part of the same local calling area. It is to be noted that although each site forms part of the PSTN 16, they are shown separately to illustrate the concepts of Wide Area Centrex. That is, each central office 19a, 19b and 19c is also used for non-Centrex customers and thus each is shown connected to the PSTN 16. It should be noted that the centrex customers at location 13, 14 and 15 are all served by central office switch 11 via remote line peripherals, i.e. such as concentrators 22a, 22b and 22c. Note that the concentrators would actually be physically located with switching offices 19a, 19b and 19c respectively.

With existing Wide Area Centrex services, each site which is located within the same exchange, can be reached using a single NPA NXX. (For the sake of simplicity, reference to the NPA will be omitted in the description which follows.) For example, station 17 can reach any Centrex site using the NXX 567, even though the remote sites are located in areas served by central offices with different NXXs. On the other hand, non-Centrex telephone stations in the site 1 serving area are normally assigned telephone numbers with the NXX of 234, site 2 with an NXX of 789, site 3 with an NXX of 456, and the main site with an NXX of 567.

When a caller at Centrex station 20 wishes to reach another Centrex station, he or she can simply dial the "intercom" number, typically the last four digits of the Private Numbering Plan, to complete the call. Calls to non-Centrex stations are recognized by full-length (i.e., 7 or 10-digit) called numbers that are prefixed by an "escape" code, typically the digit 9. If no escape code is used, then the call becomes an intra-Centrex call, wherein (typically) four digits are used to route the call, the missing digits being implied by a Business Group ID (BGID) assigned to the station by Telco personnel at Centrex network setup time. In this example, if a caller at Centrex station 20 wished to reach Centrex station 21 of site 2, digits 4567 would be dialed at station 20. The digits would be received by central office 11 via remote concentrator 22a.

For non-centrex calls, a caller at station 17 who wishes to reach station 18 served by switching office 19a from the public switched telephone network (PSTN) 16 would dial 234-XXXX. Any call to a station with an NXX of 234 would be routed the same way. Similarly, calls to stations having an NXX of 789 and 456 will be routed via switching offices 19c and 19b, respectively. On the other hand, a caller at station 17 wishing to reach station 20a of the centrex customer located at site 1, would dial the centrex customer's published number, i.e. 567-1234 even though the actual physical address of station 20a is 234-XXXX. When the call is made, the 567-1234 digits would be received at central office 11, which is the main centrex service site. Central office 11 would determine from the last four (4) digits that the called station is located on site 1. The call would then be routed via concentrator 22a to station 20a.

When a caller at station 20a wishes to reach another centrex station, the caller can simply dial the extension number or last 4 digits of the private numbering plan to complete the call. If an escape code, such as digit 9, is dialed, the call is treated as a normal call through the PSTN, but via central office 11 and not switching office 19a. If no escape code is used, then the call becomes a centrex type call, wherein the 4 digits are used to route the call. In this example, if a caller at station 20a wishes to reach station 21 of site 2, digits 3456 would be dialed at station 20a. The digits would be received by central office 11 via concentrator 22a and the call routed to station 21 via concentrator 22b. Even if a caller at station 20a wishes to call a station located on the same location, for example, station 20b, the call would still be routed via concentrator 22a to switch 11 and back again to station 20b.

Thus, this arrangement allows all customer locations to be served by a single NXX, which becomes, in effect, a Private Numbering Plan that can be administered by the customer. As can be seen, although most of the fundamental business needs are met, this solution is costly to deploy, inefficient, and not available to locations with small numbers of lines. Thus, it is an irritant for customers with a large main office and many small branches within a city, the major banks exemplifying this type of customer. For example, if a remote site has 20 lines required for Centrex services, a concentrator with a minimum cost-effective capacity of 150 lines is the best that can be offered. The customer is thus paying for a system which has a much higher capacity than is required.

Referring now to FIG. 2, the block diagram illustrates the network elements required to provide a Virtual Wide Area Centrex according to the present invention. As in FIG. 1, the customer requires a Wide Area Centrex service amongst a main site 30 and three remotely located sites, i.e., sites 1,2, and 3. In FIG. 2, instead of making use of concentrators and dedicated facilities, the main site 30, and remote sites 1, 2 and 3 are connected to each other via their respective Central Office (CO) and PSTN 16. However, with the network of the present invention, the telephone numbers associated with a customer's Centrex service are assigned a virtual (typically a 4-digit) Private Numbering Plan number, with total separation of the virtual customer network address (CNA) and real network node address numbers (NNA). That is, the customer network address is a virtual telephone number used within the centrex network and outside thereof to reach another centrex subscriber station. On the other hand, the real network node address is used by the network to route calls internally and externally of the centrex network. The NNA is not meant to be visible by the centrex subscriber but is used to identify a physical, i.e. real address associated with the dialed CNA.

The translation from virtual to real, and vice-versa, takes place at an SCP 31, allowing remote Centrex stations to be served from any central office capable of launching SS7 messages to the SCP. Costly remote concentrators can then be removed or re-homed; small locations, not previously accessible, can then be served cost-effectively on ordinary lines from their nearest central office. As indicated above, not all SS7 network elements are shown for sake of clarity.

For example, although dashed lines are used from the central offices of each site directly to the SCP 31, the links could also be accomplished via STPs.

To set up a network according to the present invention, the NNAs are made identical to the non-abbreviated versions of the original Centrex station telephone numbers, or to the PSTN numbers of those former non-Centrex stations which can now be accommodated in a Wide Area Centrex solution. With respect to the CNAs, the NXX of the CNA is made identical to the original NXX of the main site—567 in the FIG. 2 example. To minimize number changes and service disruption, the last four digits of the CNAs for users at the main site are made identical to the last four digits of their original Centrex station numbers. Users at sites 1, 2, and 3 are assigned CNAs from spare numbers in the 567 NXX, resulting in number changes at these locations. A number translation matrix for use with the present invention is disclosed in applicant's United States patent (Ser. No. 08/445,538), which is incorporated herein by reference.

Before discussing call flows in detail, a high-level description of how calls are routed to and from the PSTN is provided as this represents a departure from the prior art. In one embodiment of the invention, for a call from a Centrex station to a PSTN station, say from calling station 20 to called station 17, an escape code (e.g., the digit 9) is recognized by central office 19. The call is then routed directly into the PSTN, thence to station 17, which is consistent with prior art solutions for Wide Area Centrex. In another embodiment of the invention, all calls from a centrex serviced telephone network device, regardless of whether they contain an escape code or not, trigger a query to the SCP 31. The advantages of sending a query to the SCP for each call will be described further below.

For a call in the reverse direction, where station 17 initiates the call, the routing is necessarily indirect. This is because, as mentioned earlier, the dialed number is treated as a virtual number, i.e. CNA upon entering the Centrex network. In the example at hand, the PSTN routing recognizes the called 567 NXX as belonging to central office 11 and routes the call there. A database lookup is then done by switch 11 to translate the CNA into an NNA, whereupon it is recognized by switch 11 that the call should be routed to central office 19 and completed to Centrex station 20.

The call flows are now examined using the network configuration of FIG. 2 and the call flow diagrams of FIGS. 3a and 3b and FIG. 4. A number of different AIN triggers can be used in accord with the present invention. For the FIGS. 3a and 3b flow diagrams, the Individual Dial Plan (IDP) trigger is used. For the FIG. 4 flow diagram, the Terminating Attempt (TA) trigger is used. Triggers can be either "assigned" or "office". With an "assigned" trigger, any call transversing the switch encounters the trigger.

As the call progresses through the trigger check point, the criteria for that trigger is checked. The criteria, which can be established by a service order data fill, can include a specific line, trunk, dialed number, etc. If a match is found for the criteria, the query is sent to the SCP. If no match is found, the call continues to progress until another check point is encountered. As in this example, the assigned trigger is a particular number, and if the dialed number matches the number assigned in the trigger, a query will be automatically sent to the SCP.

In the example of FIGS. 2, 3a and 3b, an internal Centrex call originates at station 20 and terminates at station 21.

Following collection of the dialed digits 40 at switch 19, call processing encounters an AIN trigger 41 that has been pre-assigned to station 20 by Telco personnel. As described above, if the collection of all the expected digits meets the trigger's criteria, the SCP is accessed 41. In FIG. 2, a TCAP query is formulated at CO 19. This TCAP query includes the called number, i.e. 5678 CNA of station 21 and calling line ID of station 20, i.e. NNA 234-4567. As will be described below, the SCP performs 2 translations, i.e. one for the called number and one for the CLID of the calling party. This is because the CNA is a virtual number used only by the subscriber and the NNA is used by the network for routing the calls. At the SCP, a database lookup 42 is done using the switch-supplied NNA from the CLID field as a key. If the NNA lookup yields no CNA (i.e., no user has been assigned to the station) 43, then the number of the customer's Private Numbering Plan administrator is substituted for the called number 44. Assuming an originating NNA with a valid CNA is assigned, the first digit of the called number is examined for the escape code 45. As this is an internal call, there is no escape code and a database lookup 46 is done using a composite of the BGID and the dialed CNA number as a key. If the CNA is found to be invalid (i.e., not assigned to a station), the SCP returns a treatment code; otherwise, the SCP translates the CNA into an NNA 47 and inserts it into the called number field. The translated number is tested 48 to ensure it is not the customer's PNP administration center—if it is, the SCP service logic bypasses conversion of the switch-supplied CLID. Otherwise, the CLID is translated from an NNA to a CNA 49 and inserted into the calling number field. It is necessary to translate the switch-supplied CLID from an NNA to a CNA 50 so that the called party receives a number that can be called back.

Switch 19 receives the response from the SCP and deals with a treatment code 52, if any, by aborting the call in the indicated manner. Otherwise, it overwrites the called and calling numbers with data from the appropriate fields in the SCP's response 53. The Conversion Flag is set 54 so that the call will complete to the destination without being presented again to the SCP for number translation. Normal call processing is then executed 55: If the called NNA indicates an internal call, the switch executes normal Centrex call processing; otherwise, it routes the call to the Centrex switch serving the remote location, this being identified by the NXX digits of the called NNA.

With reference to FIG. 2, whereas CO 19 would normally establish a call set-up with using the CNA of station 21 and NNA of station 20, with the method of the present invention, when a response is received from SCP 31 at CO 19, an Initial Address Message (IAM) containing the NNA of station 21 and CNA of station 20 is transmitted to CO 23. The NNA of station 21 being the real address enables the PSTN network to route the call, whereas the CNA of station 20 enables station 21 to determine the identity of the caller and number required to call to return the call if necessary. When received at CO 23, the call path with station 21 will be completed. The CLID of station 20, i.e. CNA will be provided to the called station 21. The CNA of calling station 20 is provided instead of the NNA since that is the call back number that has to be used.

Referring again to FIGS. 3a and 3b, the following paragraphs describe a call that originates at Centrex station 20 and terminates at station 17 in the PSTN.

Following collection of the dialed digits at switch 19, call processing encounters an AIN trigger 40 that has been pre-assigned to station 20 by Telco personnel. Collection of all the expected digits meets the trigger's criteria and the SCP is accessed 41. At the SCP, a database lookup 42 is done using the switch-supplied NNA from the CLID field as a key. This NNA belongs to the calling party. If the NNA lookup yields no CNA (i.e., no user has been assigned to the station) 43, then the number of the customer's Private Numbering Plan administrator is substituted for the called number 44. Assuming an originating NNA with a valid CNA assigned, the first digit of the called number is examined for the escape code 45. Since the called number is preceded by the escape code, 9, the subsequent digits are an external destination telephone number and do not need to be translated. However, it is necessary to translate the switch-supplied CLID from an NNA to a CNA 50 so that the called party receives a number that can be called back. As the calling CNA identifies a specific user, network access privileges are screened 51 to determine the user's authorization to make toll, overseas, or other types of expensive calls. If the type of call is not allowed, the SCP returns an appropriate treatment code. Thus, by verifying the presence of an escape code at the SCP, unauthorized calls made via the PSTN may be blocked or screened based on the service privileges of the subscriber using that telephone. If no such screening is required, the use of an escape code may be identified at the CO 19 instead of the SCP 31.

Switch 19 receives the response from the SCP and deals with a treatment code 52, if any, by aborting the call in the indicated manner. Otherwise, it overwrites the calling number with data from the appropriate field in the SCP's response 53. The Conversion Flag is set 54, although it is not normally used on a call to the PSTN. Call processing resumes 55 and the call is routed to the PSTN 16, and ultimately to station 17.

Referring to FIG. 4, calls that originate at stations in other switches and are received on a trunk at Centrex switch 11 will now be described. The first paragraph describes a call from a Centrex station, the second and third a call from PSTN station 17 destined for Centrex station 20, and the fourth deals with invalid scenarios.

The call flow of FIG. 4 is picked up at the point where the process described in FIGS. 3a and 3b resulted in the originating Centrex switch establishing a trunk connection to terminating Centrex switch 11. The digits are collected by the terminating switch 70 and the terminating trigger criteria of 71 and 72 are tested. Since the called NNA is a Centrex station at the switch and the Conversion Flag is set, the switch executes normal Centrex call processing to the terminating station.

Assuming now that a call has originated in the PSTN, the call flow is picked up at the point where a trunk connection has been established between the PSTN and switch 11. (Generally, all calls from the PSTN to the Centrex NXX are presented to switch 11 because the NPA NXX of the called CNA is a valid, non-ambiguous NANP destination pointing to this switch.) In this case, the terminating trigger criteria are met because the called number falls into the range of VWAC stations and the Conversion Flag is not set. (Because a called number from the PSTN is virtual and not real, the switch cannot complete the call to a Centrex station—a translation of the called number from a CNA to an NNA is mandatory.) Because the trigger criteria have been met, a query is launched to the SCP 74. The SCP does a database lookup on the called number and if there is an assigned NNA, this is placed in the appropriate response field. Otherwise, the SCP returns a treatment code.

Switch 11 receives the response from the SCP and deals with a treatment code 77, if any, by aborting the call in the indicated manner. Otherwise, it overwrites the called number with data from the appropriate field in the SCP's response 78 and sets the Conversion Flag 79. Call processing resumes 73, upon which it is determined that the call should be forwarded to Centrex switch 19 and thence to station 20.

Finally, there are the cases where the NNAs are dialed directly, which is inappropriate as they are irrelevant to the customer and its station users. Referring to FIG. 2, the CNA for Centrex station 20a is 567-1234 whereas its NNA is 234-4567. Say PSTN station 18, which is also served by switch 19, dials 234-4567. Although this is an intra-switch call, it still encounters the terminating trigger for Centrex station 20 and meets that trigger's criteria, thereby launching a query on the SCP. A database lookup is done, assuming the called number is a CNA, whereupon it is found that there are no valid conversions in the database for the 234 NXX. Consequently, a treatment code is returned. (In fact, in this example, 234-4567 has been reserved for Centrex use and therefore is a "no such number" in the PSTN.) For the second example, say PSTN station 17 dials 234-4567. The PSTN routes this call to switch 19, whereupon it enters the call flow described in FIG. 4. Because the number is in the Centrex range and the Conversion Flag is not set, 71 and 72, a query is launched to the SCP. Again, a database lookup is done, assuming the called number is a CNA. Again, it is found that there are no valid conversions in the database for the 234 NXX and a treatment code is returned.

As stated earlier, in order to work properly, terminating features such as Caller ID, Call Return/Automatic Callback/Ring-Again, and some types of IVMS must capture telephone numbers which, when returned, will reach the original calling party. This means that if a call is received from a caller with a virtual number (i.e., a CNA), then it is the virtual number that must be captured and not the traditional switch-supplied CLID. The call flows described in FIG. 3 and FIG. 4 meet this requirement. FIG. 5a and FIG. 5b show the necessary database tables. FIG. 5a represents the more conventional translation of a virtual called number into a real one for network routing. FIG. 5b, on the other hand, represents a "criss-cross" table wherein the switch-supplied CLID is translated into a "dialable" CLID. Note that one table is the mirror image of the other, the search key and the record being interchanged. Thus, given this similarity, both tables can be updated from a single service order.

As a final note, it is necessary to convert switch-based operational measurements pertaining to Centrex stations from NNA to CNA since the former have no meaning to the customer. Station Message Detail Recording (SMDR) data is a prime example. This conversion can be done via an outboard processor having an internal lookup database that is kept current by the SMS.

The following deals with variations to the preferred embodiment, as well as some novel capabilities.

First off, routing variations for incoming calls from the PSTN are possible and may be desirable. In the above description, all incoming calls are routed to the switch serving the main site 11. Remembering that this solution is targeted at customers with a large main site and numerous geographically diverse smaller ones, this is a good strategy. However, an analysis of traffic patterns might suggest, for example, that calls to the VWAC from the east end of the PSTN (see FIG. 2) are best routed to switch 19 instead of switch 11. In other words, a switch in the east end of the PSTN receives a call destined for the 567 NXX, but instead of routing it to CO 11 routes it to CO 19. This is a good strategy provided that the majority of Centrex-destined calls originating in the east end of the PSTN are indeed destined for Centrex stations served by switch 19.

Currently, the industry is considering Conversion Flags for other purposes such as Local Number Portability. However, in the absence of such a flag, the functionality can be emulated in the SCP by doing a lookup on the switch-supplied CLID prior to CLID conversion. If the CLID is from a Centrex station, it can be assumed that the Conversion Flag is set; otherwise, it is not set.

A particularly important novel capability is the ability for users to change physical location at will, including the ability to move from any customer geographic location in the VWAC to any another. With prior art, this has been a major administrative expense, both for the customer and the Telco. It has also been disruptive to the customer's ongoing business as office moves have resulted in long periods of substandard telephone service. The VWAC solution solves the problem, as follows.

If a user (or an unauthorized person) attempts to make a call from an unassigned location, that call is automatically routed to the customer's PNP administrator without conversion of the switch-supplied CLID (which is an NNA) Alternatively, if a user moves into a new office and then calls the PNP administrator, the CLID on that call is not converted from an NNA to a CNA (refer to FIG. 3). In either case, the administrator receives a call in which the CLID identifies the caller's station (i.e., the caller's physical location, as opposed to the caller's identity). The caller provides his or her identity (i.e., the CNA) and a Personal Identification Number (PIN). Assuming the CNA and the PIN match, a service order for the SMS can then be created which matches the user to the physical location—i.e., matches the CNA to the NNA. At the SMS, this involves deleting the user from an old physical location (if previously assigned) and reinstating him or her at the new location.

The portability concept can be extended to the point of full automation where the user interacts with an interactive Voice Response System which extracts the NNA from the CLID and the CNA from the user via a telephone dial pad, then feeds the data to the SMS. This allows users even more freedom—for example, to temporarily transfer their service to guest offices and conference rooms. This is accomplished by marking the NNAs for such locations as being targets for temporary service only. Service reverts back to the user's normal location at the end of an interval established during session setup, or at the end of the business day.

In general, the concept of identifying users instead of physical stations allows important network capabilities to be ported. The assignment of user privileges is a case in point. With the prior art, user privileges are assigned to stations at the serving switch. With the present invention, user privileges are looked up in the database at the time of CLID lookup and fed to the Centrex switch where they are inserted into the call data as a traveling class mark. Thus, privileged users can use expensive call routing arrangements, access exclusive service features, and even be able to barge into calls within their customer group.

I claim:

1. A method of configuring a telephone network for providing Wide Area Centrex services to a number of customer sites having a plurality of telephone network devices, said telephone network having a number of telephone switching offices equipped with SSPs (Service Switching Points) operating with AIN (Advanced Intelligent Network) application software for providing Centrex functionality to said telephone network devices at said customer sites, comprising the steps of:

a) assigning, as a switch resident datafill, a network node address (NNA) to each telephone network device used at said customer sites requiring Centrex functionality;

b) assigning a customer network address (CNA) to each of said telephone network devices, each assigned CNA having a corresponding NNA;

c) assigning, as a switch resident datafill, a Business Group ID (BGID) to each of said telephone network devices to enable a Centrex subscriber using said telephone network device to reach another telephone network device in one of said customer sites using abbreviated dialing of said CNA; and d) providing, to each of said SSPs, access to a number translation database table to provide when requested by said SSPs a translation of a CNA to a corresponding NNA and of a NNA to a corresponding CNA when Centrex and Public Switched Telephone Network (PSTN) calls are received and initiated from and to one of said telephone network devices.

2. A method as defined in claim 1, wherein each number dialed for all originating calls, whether dialed by a Centrex subscriber or received from the PSTN, is treated as a CNA.

3. A method as defined in claim 1, wherein the BGID plus the dialed abbreviated CNA are translated at said number translation table into an NNA to determine how to route a call to a telephone network device at any one of the customer sites served by the Centrex type services.

4. A method as defined in claim 3, wherein an originating switch-supplied Centrex Calling Line ID (CLID) is translated at said number translation table, from an NNA to a CNA prior to authorizing the switch to execute call completion, either to an internal Centrex station or to the PSTN.

5. A method as defined in claim 4, wherein an AIN trigger datafill is assigned, as switch-resident datafill, such that at least some Centrex related calls generate queries to said number translation table if certain criteria are met.

6. A method as defined in claim 5, wherein a conversion flag is set on the call after a called number translation, at the SSP that launched the query to indicate that the called number has been converted from a CNA to an NNA.

7. A method as defined in claim 6, wherein said conversion flag is used at a terminating switch to ensure that no call can be terminated at a Centrex station unless the called number has been converted to an NNA.

8. A method as defined in claim 1, wherein said number translation table is located at a remotely located Service Control Point (SCP).

9. A method as defined in claim 8, wherein incoming calls from the PSTN having a CNA are routed to any one of said telephone network devices by:

receiving at an SSP associated with said CNA a call having a number of digits sent from a calling station;

identifying said call by a combination of the digits sent and the absence of an indicator signifying prior translation of said digits;

formulating a Transaction Capabilities Application Part (TCAP) query message appropriate to an AIN trigger used, containing the received digits;

transmitting the query message from the SSP of the first customer site to said remotely located SCP via a common channel transport facility;

pre-translating at the SCP the received digits into a set of digits that can be used to route the call to any one of said customer sites served by SSPs; and formulating a TCAP response message at the SCP containing the routing number associated with said CNA.

10. A method is defined in claim 9, wherein calls are determined to be directed to the PSTN if the dialed digits are preceded by an escape code.

11. A method as defined in claim 8, wherein a Centrex type call from a telephone network device of a first customer site to a telephone network device of a second customer site is routed by:

receiving at the SSP of the first customer site the digits sent from the calling telephone network device;

upon receipt of all digits, formulating a Transactions Capabilities Application Part (TCAP) query message appropriate to an AIN trigger used, containing the called number;

transmitting the query message from the SSP of the first customer site to the remotely located SCP via a common channel transport facility;

determining at the SCP if a valid user has been assigned to the calling telephone network device;

determining if the digits sent from the calling station indicate a PSTN or Centrex type call by the presence or absence of an escape code;

pre-translating at the SCP the called number to determine how to route the call to any one of said customer sites served with Centrex type services; and formulating a TCAP response message at the SCP containing the routing number associated with said CNA.

12. A method of providing Wide Area Centrex services to a number of customer sites having a plurality of telephone network devices, said telephone network having a number of telephone switching offices equipped with SSPs (Service Switching Points) operating with AIN (Advanced Intelligent Network) application software for providing Centrex functionality to said telephone network devices at said customer sites, comprising the steps of:

a) assigning, as a switch resident datafill, a network node address (NNA) to each telephone network device used at said customer sites requiring Centrex functionality;

b) assigning a customer network address (CNA) to each of said telephone network devices, each assigned CNA having a corresponding NNA;

c) assigning, as a switch resident datafill, a Business Group ID (BGID) to each of said telephone network devices to enable a Centrex subscriber using said telephone network device to reach another telephone network device in one of said customer sites using abbreviated dialing of said CNA;

d) providing, to each of said SSPs, access to a number translation database table to provide when requested by said SSPs a translation of a CNA to a corresponding NNA and of a NNA to a corresponding CNA;

e) receiving at an SSP of a first customer site a call having a number of digits sent from a calling station;

f) identifying from the dialed digits an internal Centrex call and formulating a Transaction Capabilities Application Part (TCAP) query message appropriate to the AIN trigger used, containing the received digits;

g) transmitting the TCAP message from the SSP of the first customer site to a remotely located SCP, containing said number translation table, via a common transport facility;

h) pre-translating at the SCP the called number to determine how to route the call to any one of the said customer sites served with Centrex type services;

i) formulating a TCAP response message at the SCP containing the NNA associated with said CNA;

j) transmitting the formulated message to the SSP of the first customer site to instruct the telephone network how to complete the call; and k) translating the switch-supplied NNA of the calling station to a CNA such that Centrex type terminating station features can be maintained at each customer site.

13. A method as defined in claim 12, further comprising the steps of:

determining if the digits sent from the calling telephone network device are indicative of a Centrex type call or a Public Switched Telephone Network (PSTN) type call; and if the digits sent are indicative of a Centrex call, identifying an SCP process from the identity of the SSP's AIN trigger.

14. A method is defined in claim 13, wherein calls are determined to be directed to the PSTN if the dialed digits are preceded by an escape code.

15. A telephone network for providing Wide Area Centrex services, having a plurality of Centrex switching offices equipped with Service Switching Points (SSPs) operating with Advanced Intelligent Network (AIN) application software, said network having a switching office for providing Centrex functionality to a number of customer sites, each served by separate switching offices, comprising:

a Service Control Point (SCP) connected to each switching office and having a number translation database containing customer network addresses (CNAs) that have been assigned to each telephone device used at the customer sites;

each SSP of a customer site being adapted to receive a number of digits sent from a calling station;

means for identifying, at the SSP, the criteria necessary to trigger a query to the SCP;

means for formulating a Transaction Capabilities Application Part (TCAP) query message appropriate to the AIN trigger used;

means for transmitting a Signalling System 7 (SS7) message from the SSP to the SCP via a common transport facility;

means for pre-translating at the SCP the received message to determine a routing number to route the call to any one of said customer sites served with Centrex type services;

means for formulating a TCAP response message at the SCP containing the routing number;

means for transmitting the formulated message to the SSP of the customer site to instruct the telephone network how to complete the call; and means for translating the switch-supplied network node address (NNA) of the calling station to a CNA such that Centrex type terminating station features can be maintained at each customer site.

16. A network as defined in claim 15, further comprising:

means for determining if the digits sent from the calling station are indicative of a Centrex type call or a Public Switched Telephone Network (PSTN) type call, and if the digits sent are indicative of a Centrex call, identifying an SCP process from the identity of the SSP's AIN trigger.

* * * * *